United States Patent Office 3,398,020
Patented Aug. 20, 1968

3,398,020
HYDROPHOBIC POLYHYDROCARBON SUBSTRATES COATED WITH CYCLOPENTADIENE HOMOPOLYMER
John R. Caldwell, Kingsport, Tenn., assignor to Eastman Kodak Company, Rochester, N.Y., a corporation of New Jersey
No Drawing. Original application Feb. 8, 1961, Ser. No. 87,741, now Patent No. 3,143,422, dated Aug. 4, 1964. Divided and this application Aug. 3, 1964, Ser. No. 387,192
6 Claims. (Cl. 117—138.8)

ABSTRACT OF THE DISCLOSURE

Cyclopentadiene homopolymers have been found to provide unusually adhesive coatings on hydrophobic polyhydrocarbon surfaces without the necessity of first subjecting the surfaces to modification. The coated hydrophobic polyhydrocarbon surfaces provide good adhesion for coatings such as photographic emulsions and the like. In addition, fibers of hydrophobic polyhydrocarbons coated with the cyclopentadiene homopolymers provide treated fibers having an affinity for dyes.

---

This application is a division of U.S. patent application Ser. No. 87,741, filed Feb. 8, 1961, now U.S. Patent No. 3,143,422.

This invention concerns coatings for hydrophobic films and fibers, more particularly cyclopentadiene polymers coated on unmodified hydrophobic polymeric hydrocarbon surfaces.

Many polymeric surfaces are extremely difficult to coat for purposes such as printing, coloring, and the like. They are particularly difficult to adhere to certain types of coatings such as photographic emulsions. During the subsequent processing steps, the handling of these coatings results in frill, and the like.

Surface modification of polymeric sheeting is normally carried out to obtain adhesion. Typical surface modification includes electron bombardment, oxidation, embedment of abrasive particles such as silica and the like. However, this treatment is expensive and is not readily adaptable to filaments or fibers. Therefore, it has been desirable to find a coating composition to be applied to such hydrophobic polymeric hydrocarbon surfaces as polyethylene, polypropylene, or the like.

I have found a method of coating hydrophobic surfaces with a polymeric material which has good adhesion to the untreated (unoxidized or the like) polyhydrocarbon surfaces.

One object of this invention is to provide a coating composition for use on hydrophobic polyhydrocarbon surfaces which have not been subject to surface modification. An additional object is to provide a polymeric hydrocarbon sheeting having an adherent coating. A further object is to provide a process for coating hydrophobic polyhydrocarbon surfaces to obtain adhesion for coatings such as photographic emulsions and the like. Another object is to provide a method of treating fibers of hydrophobic polyhydrocarbons in order to impart an affinity for dyes.

The above objects are obtained by treating a hydrophobic polyhydrocarbon fiber or film with a polymer derived from cyclopentadiene and subsequently curing and cross-linking the polymer.

Polymeric hydrocarbons which may be treated by the process of this invention include polyethylene, polypropylene, polystyrene, poly-4-methyl, pentene, polyallyl benzene, polyallyl cyclohexane, polyallyl bicycloheptane, and poly-5-ethyl hexene. Polyolefins of 2–10 carbon atoms and their blends are included. In general, the process is applicable to any type of hydrocarbon whether amorphous or crystalline. The processes are particularly valuable for treatment of films and fibers made from low pressure, crystalline type polyethylene and polypropylene.

Cyclopentadiene polymers which may be used in this invention may be prepared by treating cyclopentadiene with a Friedel-Crafts catalyst at a temperature of −60° to −100° C. The preparation is described in U.S. Patents 2,220,211, 2,314,908–9–10, 2,314,903, and in Bruson Ann., 447, 110 (1926), I.E.C., 18, 381 (1926). The polymer has the following structure

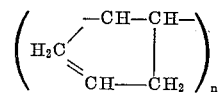

in which $n$ is a number from 15 to 250 which corresponds to a molecular weight of about 1,000 to 16,000. It is soluble in chlorinated aliphatic hydrocarbons such as chloroform and methylene chloride. It is also soluble in benzene, toluene, and other inert organic volatile solvents. Because of its unsaturation, the polymer cools or air dries in a few minutes and becomes insoluble. This permits high speed processing of films, fibers, and the like. Curing may take place at room temperature but can be hastened by curing at elevated temperatures. Driers such as cobalt and manganese driers increase the rate of cure. These may be applied in an amount of 0.005 to 0.10% based on the amount of cyclopentadiene polymer.

The polymer is applied to the surface of the polyhydrocarbon film fiber or other shaped object from a solution. The amount applied will depend on the amount desired. The approved adhesion for printing ink may be obtained with a layer approximately 0.0001 inch to 0.001 inch thick. In order to obtain practical shades with dyes, 0.001 inch to 0.005 inch may be required.

The coating may be cured and/or modified by the action of sulfur dioxide, sulfur monochloride, sulfur, and rubber accelerators such as tetramethylthiuramdisulfide and mercaptobenzothiazole and the like. The cyclopentadiene polymer is valuable for anchoring pigments, dyes, and other coloring or opacifying materials to the surface.

In our preferred embodiment, 10–25% polymer is prepared in toluene or benzene. In certain instances, the amount of polymer may be varied from 5–40% depending upon the purpose for which it is being applied. To this solution may be added materials such as aluminum powder, carbon black, titanium dioxide, iron oxide, phthalocyanine pigments, azo dyes, etc. The suspension is applied and the solvent evaporated. When the polymer is cured, the pigment is held firmly on the surface. Oil soluble dyes may be bonded to the surface in a similar manner.

Other polymeric materials may be mixed with the cyclopentadiene polymer to modify its properties providing at least 50% of the mixture is the cyclopentadiene polymer. The modifying materials may include natural rubber, synthetic rubber, neoprene, chlorinated or chlorosulfonated polyethylene, polyacrylates, polymethacrylates, polyacrylamides, polyesters, polyurethanes, alkyds, polyamides, polyepoxides, etc. Plasticizers, drying oils, rosin acids, unsaturated fatty acids, and rosin esters may be included in the coatings to modify the properties.

The following examples are intended to illustrate my invention but are not intended to limit it in any way.

EXAMPLE 1

Cyclopentadiene was dissolved in chloroform or benzene and polymerized at −20° C. with stannic chloride catalyst as described by Bruson in Ind. Eng. Chem., 18, 381 (1926). The polymer was precipitated by pouring the solution into absolute alcohol. This treatment removed the catalyst. The polymer was then dissolved in benzene and the solution was filtered. The concentration was adjusted to 10–12% solids.

(A) The benzene solution of the cyclopentadiene polymer was applied to drafted polyethylene and polypropylene film to form a layer approximately 0.0002 inch thick, on a dry basis. The film was then passed through an oven at 80–90° C. for 1 min. At this stage the coating was tack-free. The coated film showed excellent adhesion for printing inks. The treated films also had very good adhesion when coated with styrene-butadiene rubber, neoprene, and polyvinyl chloride.

(B) Polystyrene, polyethylene, and polypropylene films were coated with a layer approximately 0.002 inch thick of the cyclopentadiene polymer. The coated film was then exposed to vapors of sulfur monochloride for 1–2 minutes. The treated films had excellent adhesion for printing inks. They dyed to deep shades with cellulose acetate dyes.

(C) Aluminum flake pigment was added to the solution of cyclopentadiene polymer and the suspension was applied to films of polyethylene, polypropylene, polystyrene, and poly-4-methylpentene. The solvent was evaporated and the coated films were heated at 60–70° C. for 10 minutes. The coating showed excellent adhesion even when the films were sharply creased. These films had reduced permeability to gases and organic vapors.

(D) Carbon black was used in place of the aluminum pigment, as described in C above. The coating had very good adhesion.

(E) Monastral Fast Blue BC (Color Index No. 481) was used in place of the aluminum pigment, as described in C above.

(F) Oil Red No. 7 (oil-soluble dye, Color Index No. 258) was added to the solution of cyclopentadiene polymer in benzene. The solution was applied to films and fibers made from polyethylene, polypropylene, polystyrene (crystalline type), and polyallylbenzene. The solvent was evaporated and the treated materials were heated at 70–80° for 5 minutes. The dye was firmly bonded to the surface.

EXAMPLE 2

0.30 cubic centimeter of aluminum chloride-diethyl ether complex was added to 60 grams of toluene with thorough agitation to form a suspension, emulsion or solution.

A mixture of 20 grams of cyclopentadiene and 20 grams of toluene were added to the suspension during the course of 12 minutes, the temperature ranging from 26–49° C. during the addition. The mixture was then agitated for an additional hour, after which 1 cubic centimeter of water was added. This was followed by agitation for 15 minutes.

10 grams of quicklime (CaO) were then added to the reaction mixture followed by agitation for an additional hour.

5 grams of a suitable filter aid were then added, and the mixture filtered.

A filtered solution containing 16.4 grams of polycyclopentadiene was thus obtained.

(A) One part of the cyclopentadiene polymer and one part of degraded neoprene rubber were dissolved in 20 parts of benzene. The solution was applied to a polypropylene fabric to give an add-on of 0.2 oz. per square yard on a dry basis. The fabric was aged 48 hr. at room temperature. The fabric was then coated with a standard neoprene rubber coating formula. The coating had excellent adhesion.

(B) Two parts of the cyclopentadiene polymer and one part of polyoctyl methacrylate were dissolved in 40 parts of benzene. Benzoyl peroxide (0.1 part) was added and the solution was applied to fabrics of polyethylene, polypropylene, polystyrene, poly-4-methylpentane, polyallylbenzene, and polyallylcyclohexane. The solvent was evaporated to leave a deposit of approximately 0.3 oz. per square yard. The fabrics were then heated at 80° C. for 1 hr. The treated fabrics had good affinity for cellulose acetate dyes and certain types of premetallized dyes. Coatings of styrene-butadiene rubber, acrylonitrile-butadiene rubber, and neoprene rubber showed excellent adhesion.

(C) A copolymer of 75/25 lauryl acrylate and N,N-diethylacrylamide was used in place of the octyl methacrylate polymer, as described in (B) above.

(D) One part of the cyclopentadiene polymer and two parts of natural rubber were dissolved in 20 parts of benzene and the following materials were added as vulcanizing agents: 0.1 part sulfur, 0.1 part tetramethylthiuramdisulfide, 0.05 part stearic acid, 0.1 part zinc oxide. The mixture was applied to a fabric made from crystalline polystyrene fibers. After the solvent was evaporated, the fabric was heated at 140° C. for 1 hr. to cure the rubber. The coating had excellent adhesion. The add-on was 1 oz. per square yard.

EXAMPLE 3

Photographic film base made from polyethylene, polypropylene, polystyrene, and polyallylbenzene was coated with the cyclopentadiene polymer to a thickness of 0.0001 inch. The film was exposed to sulfur dioxide gas for 30 min. Gelatin and polyvinyl alcohol photographic emulsions showed good adhesion.

EXAMPLE 4

The cyclopentadiene polymer was used to bond the following materials to polyhydrocarbon films: talc, mica, Carborundum abrasive, alumina abrasive.

The cyclopentadiene compositions disclosed herein may also be used for coating other hydrophobic polymeric materials in addition to polyhydrocarbons. For instance, they have good properties for coating polyesters, polytetrafluoroethylene, and the like for certain purposes.

The adhesion of the coatings obtained using the above cyclopentadiene polymers were tested using the Scotch tape test of adhering the Scotch tape to the cured film and removing suddenly. The film surface had been scored with a knife blade prior to the application of the tape to provide a tooth in the event that the coating could be removed. Failure to pull the coating loose from the hydrocarbon surface indicated that the adhesion was satisfactory.

By unmodified as used herein is intended chemical modification of the surface such as that obtained by oxidation, electron bombardment, and the like. Films that have been modified by stretching, tentering, and the like may be surface coated by cyclopentadiene polymers satisfactorily.

This invention has been described in detail with particular reference to preferred embodiments thereof, but it will be understood that variations and modifications can be effected within the spirit and scope of the invention as described hereinabove and as defined in the appended claims.

I claim:

1. A hydrophobic polyhydrocarbon substrate having thereon a coating consisting essentially of a cyclopentadiene homopolymer having a molecular weight of from 1,000 to 16,000.

2. A hydrophobic polyhydrocarbon substrate having thereon a coating consisting essentially of a cyclopentadiene homopolymer having a molecular weight of 7,000–16,000.

3. A polyolefin substrate having thereon a coating consisting essentially of a cyclopentadiene homopolymer having a molecular weight of from 7,000–16,000.

4. A polyethylene substrate having thereon a coating consisting essentially of a cyclopentadiene homopolymer having a molecular weight of 7,000–16,000.

5. A polypropylene substrate having thereon a coating consisting essentially of a cyclopentadiene homopolymer having a molecular weight of 7,000–16,000.

6. A polystyrene substrate having thereon a coating consisting essentially of a cyclopentadiene homopolymer having a molecular weight of from 7,000–16,000.

References Cited

UNITED STATES PATENTS

| | | | |
|---|---|---|---|
| 1,720,929 | 7/1929 | Staudinger | 117—161 X |
| 2,319,271 | 5/1943 | Soday | 260—80 |
| 2,731,370 | 1/1956 | Tramm et al. | 117—155 |
| 2,864,783 | 12/1958 | Cornwell | 260—28.5 |
| 2,905,649 | 9/1959 | Craig et al. | 260—4 |
| 2,925,354 | 2/1960 | Berardinelli et al. | 117—12 |
| 2,996,441 | 8/1961 | Nelson et al. | 204—154 |
| 3,053,695 | 9/1962 | Park et al. | 117—138.8 |
| 3,201,250 | 8/1965 | Coryell et al. | 96—87 |

FOREIGN PATENTS 469,557  11/1950  Canada.

OTHER REFERENCES

Wilson, Jr., et al.: "Cyclopentadiene—A New Conjugated Diene From the Coal-Tar Industry," India Rubber World, vol. 110, April 1944, pp. 61 to 63.

Schrader et al.: "Bonding of Polyethylene," Report 2401, Department of the Army Project 593–02–005, March 1957, pp. 3 to 12.

WILLIAM D. MARTIN, *Primary Examiner.*

W. D. HERRICK, *Assistant Examiner.*